(12) United States Patent
Heppe

(10) Patent No.: US 10,450,047 B2
(45) Date of Patent: Oct. 22, 2019

(54) DURABLE AIRSHIP HULL AND IN SITU AIRSHIP HULL REPAIR

(71) Applicant: Stratospheric Airships, LLC, Hood River, OR (US)

(72) Inventor: Stephen B. Heppe, Hood River, OR (US)

(73) Assignee: Stratospheric Airships, LLC, Hood River, OR (US)

( * ) Notice: Subject to any disclaimer, the term of this patent is extended or adjusted under 35 U.S.C. 154(b) by 526 days.

(21) Appl. No.: 15/252,161

(22) Filed: Aug. 30, 2016

(65) Prior Publication Data

US 2016/0368582 A1 Dec. 22, 2016

Related U.S. Application Data

(60) Division of application No. 14/953,985, filed on Nov. 30, 2015, now Pat. No. 9,452,816, which is a
(Continued)

(51) Int. Cl.
*B64B 1/14* (2006.01)
*G01M 3/00* (2006.01)
(Continued)

(52) U.S. Cl.
CPC ............... *B64B 1/58* (2013.01); *B29C 65/50* (2013.01); *B29C 65/70* (2013.01); *B29C 70/80* (2013.01);
(Continued)

(58) Field of Classification Search
CPC .... B64B 1/00; B64B 1/02; B64B 1/06; B64B 1/14; B64B 1/40; B64B 1/50; B64B 1/58;
(Continued)

(56) References Cited

U.S. PATENT DOCUMENTS 1,860,555 A * 5/1932 Schlosser ................. B64B 1/62
244/128
6,119,977 A * 9/2000 Steele ....................... B64B 1/02
244/30

(Continued)

FOREIGN PATENT DOCUMENTS

JP 2001031200 A * 2/2001

OTHER PUBLICATIONS

Sommer, G. S. and Adams, R. E. "Airship Survival—Damage Avoidance and Control for Large Ocean-Going Airships." 1989. American Institute of Aeronautics and Astronautics, Inc. (Year: 1989).*

*Primary Examiner* — Philip C Tucker
*Assistant Examiner* — Brian R Slawski
(74) *Attorney, Agent, or Firm* — Riddle IP, PLLC; Jeffrey K. Riddle

(57) ABSTRACT

A method of repairing an airship hull of an airship during flight and while the airship is untethered from the ground comprises detecting a breach in a gas barrier bordering an interior volume of the airship, the airship containing a lifting gas wherein the hull of the airship comprises an electrically conductive material and wherein the breach in the gas barrier is detected by detecting changes in an electrical conductivity of the electrically conductive material.

18 Claims, 11 Drawing Sheets

Related U.S. Application Data continuation of application No. 13/677,046, filed on Nov. 14, 2012, now Pat. No. 9,216,806.

(60) Provisional application No. 61/563,187, filed on Nov. 23, 2011.

(51) Int. Cl.

| | |
|---|---|
| *G01M 3/38* | (2006.01) |
| *B29C 65/50* | (2006.01) |
| *B64F 5/40* | (2017.01) |
| *B64F 5/60* | (2017.01) |
| *B64B 1/58* | (2006.01) |
| *B64B 1/00* | (2006.01) |
| *G01M 3/16* | (2006.01) |
| *B29C 65/70* | (2006.01) |
| *B29C 70/80* | (2006.01) |
| *B64B 1/62* | (2006.01) |
| *G01M 3/40* | (2006.01) |
| *B29C 73/02* | (2006.01) |
| *B29C 73/10* | (2006.01) |
| *B29C 65/54* | (2006.01) |
| *B29C 65/72* | (2006.01) |
| *B64B 1/60* | (2006.01) |
| *B29L 9/00* | (2006.01) |
| *B29L 31/30* | (2006.01) |

(52) U.S. Cl.
CPC .................. *B64B 1/00* (2013.01); *B64B 1/14* (2013.01); *B64F 5/40* (2017.01); *B64F 5/60* (2017.01); *G01M 3/002* (2013.01); *G01M 3/16* (2013.01); *G01M 3/38* (2013.01); *B29C 65/542* (2013.01); *B29C 65/72* (2013.01); *B29C 73/02* (2013.01); *B29C 73/025* (2013.01); *B29C 73/10* (2013.01); *B29K 2995/0005* (2013.01); *B29L 2009/00* (2013.01); *B29L 2031/3076* (2013.01); *B64B 1/60* (2013.01); *Y10T 29/49718* (2015.01)

(58) Field of Classification Search
CPC ......... B64B 1/60; B64B 1/62; B64B 2201/00; B64B 1/16; B64B 1/64; G01M 3/00; G01M 3/002; G01M 3/38; G01M 3/40; G01M 3/02; G01M 3/04; G01M 3/16; G01M 43/005; B29C 73/00; B29C 73/02; B29C 73/025; B29C 73/04; B29C 73/10; B29C 65/00; B29C 65/48; B29C 65/50; B29C 65/52; B29C 65/54; B29C 65/542; B29C 65/72; B29C 65/5064; B29C 65/524; B29C 65/525; B64F 5/40; B64F 5/60; B64C 2201/022
USPC ........ 156/60, 64, 70, 90, 91, 92, 93, 94, 98, 156/145, 146, 147, 156, 160, 165, 230, 156/272.2, 272.8, 273.9, 285, 287, 305; 73/40; 244/24, 30, 125, 126, 127, 128; 374/4

See application file for complete search history.

(56) References Cited

U.S. PATENT DOCUMENTS

| | | | |
|---|---|---|---|
| 6,290,176 B1* | 9/2001 | Hankinson | B64B 1/02 244/125 |
| 6,302,357 B1* | 10/2001 | Kalisz | B64B 1/02 244/125 |
| 2009/0220726 A1* | 9/2009 | Liggett | B64B 1/14 428/77 |

* cited by examiner

DURABLE AIRSHIP HULL AND IN SITU AIRSHIP HULL REPAIR

RELATED DOCUMENTS

The present application is a divisional patent application and claims priority under 35 U.S.C. § 120 to U.S. patent application Ser. No. 14/953,985, by Stephen B. Heppe, filed Nov. 30, 2015, now U.S. Pat. No. 9,452,816, which is a continuation of U.S. patent application Ser. No. 13/677,046, by Stephen B. Heppe, filed Nov. 14, 2012, now U.S. Pat. No. 9,216,806, which claims priority under 35 U.S.C. § 119(e) to U.S. Provisional Application No. 61/563,187, by Stephen B. Heppe, filed on Nov. 23, 2011, and entitled "Durable Airship Hull and in situ Airship Hull Repair," which application is hereby incorporated by reference in its entirety.

BACKGROUND

Lighter-than-air airships maintain their buoyancy using lifting gas contained in a rigid or non-rigid hull. The lifting gas is typically a light gas such as hydrogen or helium. These lifting gasses can diffuse through an undamaged hull and rapidly leak through macroscopic holes and tears in damaged hull sections. A macroscopic hole or tear (hereinafter generally discussed as a "hole") can lead to rapid loss of lifting gas, loss of altitude, and potentially loss of the entire airship. The problem is particularly severe for very high altitude airships intended for stratospheric operation, where the hull material may be relatively light-weight and therefore prone to damage. For example, JAXA reported in 2008 regarding a flight experiment performed the previous year. A 300,000 $m^3$ balloon, with a hull comprised of Heptax, was successfully launched from Brazil on Nov. 20, 2007. However, it burst at an altitude of 14.7 km. JAXA theorized that the balloon may have suffered damage around the balloon spooler or collar. JAXA has also noted that unexpected gusty wind conditions during balloon inflation could lead to severe damage. Even if prompt loss of the airship is avoided, a small hole will result in a significant loss of lifting gas over time, thereby leading to a loss of altitude and a relatively rapid termination of the mission. A small hole can be caused, for example, by a natural micrometeorite or a man-made projectile such as a bullet or a piece of man-made space debris falling back into the atmosphere, as well as ongoing abrasion, excessive stress due to wind gusts, and other factors.

If a way could be found to minimize the likelihood of catastrophic damage, and rapidly repair lightly-damaged hulls "in situ" (i.e., while the airship is still at altitude), the rapid loss of lifting gas could be prevented or halted and adverse consequences could be minimized.

This invention is directed to the problem of airship hull robustness and in situ airship hull repair.

BRIEF DESCRIPTION OF THE DRAWINGS

The accompanying drawings illustrate various examples of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1A:
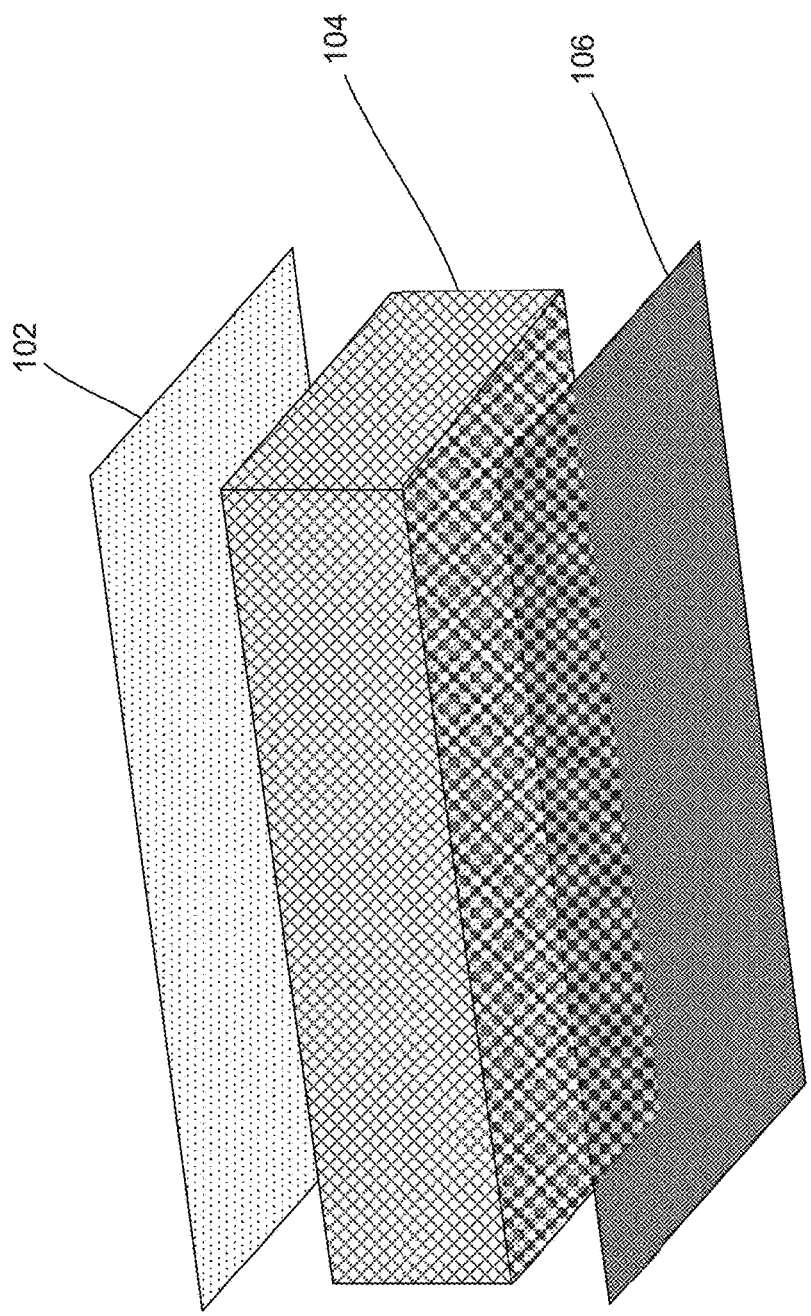
FIG. 1A illustrates an exploded view of a layered structure representing a cross section of an airship hull, according to one example of principles described herein.

A stratospheric balloon or airship is generally designed with a light-weight hull so as to minimize overall vehicle size. For example, balloons intended for operation in the upper stratosphere may have a hull thickness less than 50 µm, weighing less than 100 $g/m^2$ of effective hull surface area. Such balloons must be handled with care, and are easily damaged on the ground as well as in flight. Further, the rate at which a lifting gas, such as hydrogen ($H_2$), leaks through a surface, such as a balloon hull, will depend on its material and construction as well as operational factors such as the internal pressure of the balloon. Generally, efforts are made to limit the leakage rate through careful design. Such efforts are especially important for long-endurance missions. U.S. Pat. No. 5,279,873, awarded to Oike, describes a material that exhibits a leakage rate for $H_2$ of 3 $ml/m^2$ over a 24 hour period under standard atmospheric pressure (101 kPa). If this is scaled to the case of a large stratospheric airship with a surface area of 40,000 $m^2$ operating with an internal pressure of 520 Pa, the leakage rate would be on the order of 1 kg of lifting gas every 100 days. This must be replenished for long-duration missions, in order to prevent a loss of lifting capacity. A reservoir of lifting gas can be used, but for very long-duration missions, this reservoir may also require replenishment.

In the event that a hole occurs, lifting gas will leak out through the hole as well. The leakage rate will depend on the size of the hole, its discharge coefficient, the pressure differential between balloon interior and external (ambient) conditions, and the density of the gas. One formula that can be used to estimate the leakage rate is $$Q=C_d A_0 \sqrt{2(P_1-P_2)/\rho}$$

where Q is the volumetric leakage rate (discharge rate), $C_d$ is the discharge coefficient, $A_0$ is the aperture size, $P_1$ and $P_2$ are the internal and external pressures, and $\rho$ is the density of the gas. For a pressurized hydrogen-filled balloon or airship designed for operation in the upper stratosphere (e.g., 35-40 km), a reasonable value of $P_1-P_2=100$ Pa, and $\rho=0.5$ g/m$^3$. Also substituting $C_d=0.6$, and assuming a hole with $A_0=1$ cm$^2$ ($10^{-4}$ m$^2$), the volumetric leakage rate would be on the order of 0.04 m$^3$/sec. The mass leakage rate would be about 0.02 g/sec. If these parameters were held constant over time, a kilogram of lifting gas would escape in 50,000 seconds—less than a day, and therefore more than 100 times faster than the nominal leakage through an undamaged 40,000 m$^2$ hull satisfying the best-case performance reported in U.S. Pat. No. 5,279,873.

It may be appreciated that the illustrative parameters used here would not remain constant—as lifting gas escapes, the balloon will descend and the pressure difference will tend toward zero. Random fluctuations in the hull (fluttering) will then tend to pump lifting gas out and atmospheric gases in. The balloon or airship will continue to descend as it loses lifting gas, and as its internal lifting volume becomes "polluted" with normal atmospheric gases that cannot provide buoyant lift. Clearly, even a small hole can have serious repercussions for a high-altitude long-endurance balloon or airship.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Because of the negative consequences of a damaged hull, there is a need for hull materials that are resistant to damage, and furthermore there is a need for hull materials that resist tearing and catastrophic failure once a small hole occurs. In the event that a hole does occur, a capability to repair the hole in a timely manner, while the airship is aloft, would be beneficial. In order to repair a hole, three objectives should be achieved: a) identify the location of the hole; b) maneuver a repair mechanism to the location of the hole; and c) repair the hole. In addition to these objectives, it is also beneficial to purge the interior lifting space of the balloon or airship of nitrogen and other atmospheric gases that may have entered the balloon or airship through the hole, or even by diffusion through the undamaged hull. The three initial objectives noted above (identify location, maneuver repair mechanism, and actual repair) can be achieved through the use of sensors and manipulators jointly adapted to identify the location of a hole (breach) in the hull, maneuver a repair mechanism to the vicinity of the hole, and repair it. In one embodiment the sensors, manipulators and repair mechanism are controlled from a ground control station through the exercise of a command and control link, with data and feedback from the airship provided to the ground control station by way of a telemetry link. In this embodiment, individual actions (such as e.g. camera pointing, zoom, exposure control, arm movement, repair mechanism alignment, repair) may be scripted and commanded by a human operator, or collected into semi-automated procedures that can be initiated under human control. In another embodiment, the sensors, manipulators and repair mechanism operate autonomously under stored program control, although sensor data and system status are optionally provided to the ground control station as an adjunct to normal operations.

Strengthening the Hull

Figure 1B:
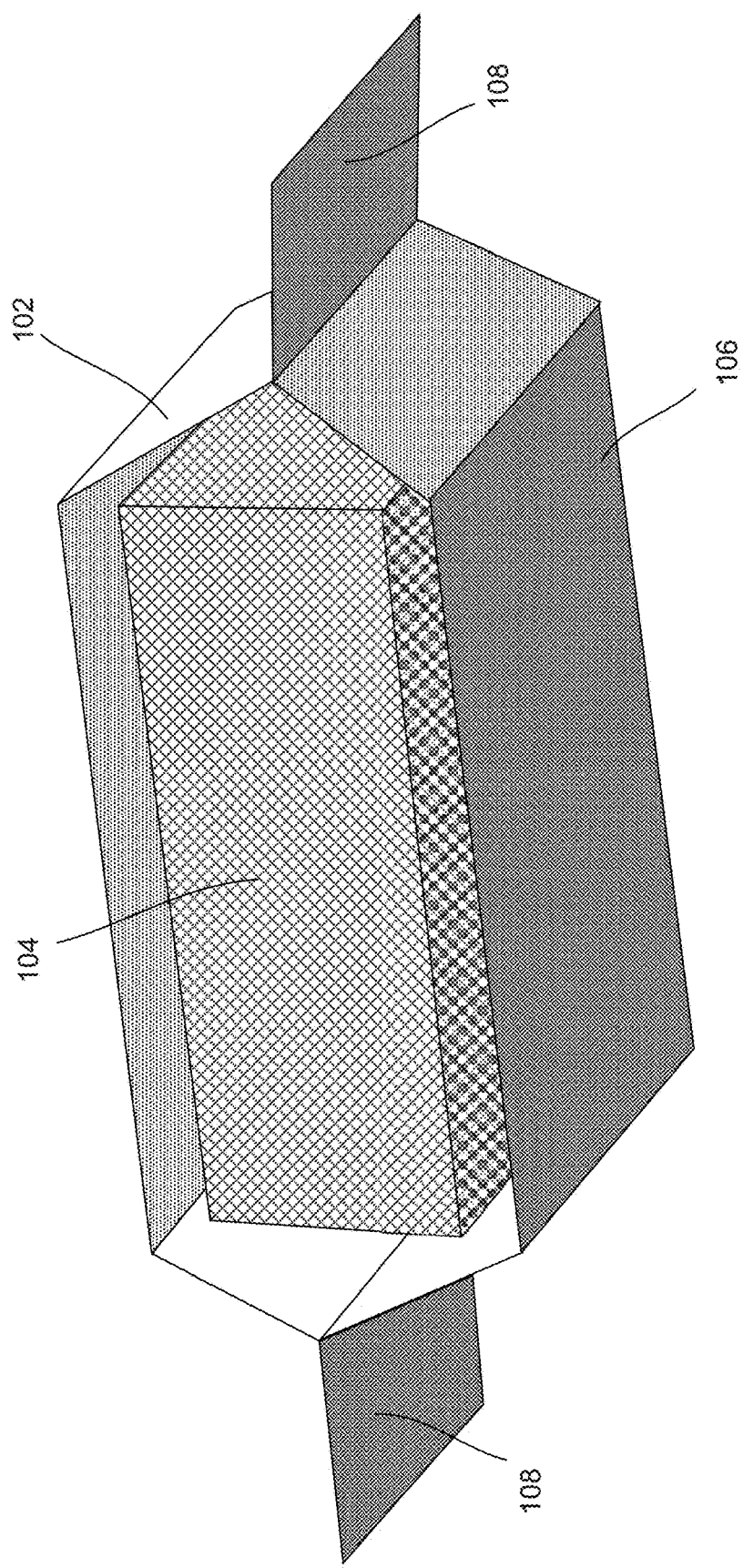
FIG. 1B shows a layered structure which sandwiches a microlattice enclosed by gas barriers to form an airship hull, according to one example of principles described herein.

A high-order objective must be to avoid, or at least minimize the likelihood of, a catastrophic hull failure that would cause immediate loss of the airship. A catastrophic hull failure can occur, for example, when a small hole rapidly expands or "tears", thereby creating a large hole that allows a rapid release of lifting gas. Note that the original hole might be quite small and operationally insignificant (at least in the short term)—it is the expansion or tearing that leads to a catastrophic failure. In order to prevent such expansion or tearing, the hull can be built with "rip stop" features such as patterning of the basic hull material (e.g., cross-hatched ridges), or high tensile strength threads embedded in the hull material. The high tensile strength threads can be natural or man-made fibers (e.g., fiberglass, plastic, metal, or even threads consisting of carbon nanotubes). Another approach is to build the hull with a layered or sandwich structure as illustrated in FIG. 1A, which is an exploded view of a three-layer structure comprising layers 102, 104 and 106. Layers 102 and 106 are gas barriers such as Heptax or the material described in U.S. Pat. No. 5,279,873 (to Oike) and noted above. By themselves, these layers substantially limit diffusion of lifting gas but may have insufficient tensile strength to strongly resist tearing. Layer 104, in contrast, is designed to act as a foundation for the gas barrier layers, provide high tensile strength, and strongly resist tearing. One structure that can beneficially be used as layer 104 was recently disclosed by Tobias Schaedler and other researchers at HRL Laboratories and the Composites Center at the University of Southern California (the illustration of layer 104 is taken from their media announcement and article in the Nov. 18, 2011 issue of Science). The researchers describe the structure as an ultralight metallic microlattice. It is composed of thin-walled tubes of nickel (actually 93% nickel and 7% phosphorous by weight, according to their disclosure) arranged in a lattice pattern as shown in FIGS. 1A and 1B. The overall structure can have a density on the order of 10 mg/cm$^3$ to less than 1 mg/cm$^3$ (counting the solid structure but not the air in the pores) depending on the manufacturing technique and the thickness of the deposited metal. For example, the microlattice may have a density of approximately 0.9 mg/cm$^3$. Such a microlattice, scaled up to a sheet 1 meter square and 1 mm thick, would weigh roughly 1 gram. Recalling that a prior-art airship might rely on a hull material that weighs between 50 and 100 g/m$^2$, it will be appreciated that an ultralight metallic microlattice, of the general type described by Schaedler et al, can be added with only a small weight penalty. In one exemplary embodiment, instead of a 50 μm hull (gas barrier), an ultralight metallic microlattice 1 mm thick is bonded and sandwiched between two separate gas barriers, each only 25 μm thick. The microlattice represents a tensile mat, or web, that tends to reduce fluttering and rippling of the hull surface, and also resists tearing. These characteristics substantially limit the likelihood of a catastrophic failure. The gas barrier layers can be bonded to the microlattice with an adhesive, or alternatively by heat treatment (gently heating the gas barriers until they adhere to the microlattice).

Many other choices for layer thicknesses and hull design are feasible, beyond those described here, and any particular embodiment will be tailored based on consideration of gas barrier and microlattice materials and material characteristics available at the time of design, and mission requirements and parameters. For example, aerographite or other suitable lattice materials could be used. Aerographite is a synthetic microlattice made from a porous interconnected network of carbon microtube material. Samples of aerographite have been formed with densities of 0.2 mg/cm$^3$. Aerographite microlattice sustains extensive elastic deformations due to its interconnected tubular structure. As used in the specification and appended claims, the term "microlattice" refers to a wide range of materials, including porous materials that have densities that are less than 10 mg/cm$^3$.

Furthermore, the principles described herein are not limited to a three-layer sandwich structure. Other embodiments include a single gas barrier bonded to a microlattice on only one side, or multiple gas barriers and multiple microlattice layers arranged in an alternating structure (for example, three gas barrier layers and two microlattice layers arranged in an alternating fashion). The different layers of the same general type (i.a, gas barrier or microlattice) may be constructed of different materials, and have different thicknesses, densities, and other physical properties. Furthermore, the individual layers may themselves be comprised of several "sublayers" one or more of which may also be considered a coating. For example, a gas barrier layer (as represented by 104, 106 in FIGS. 1A, 1B) may be comprised of an adhesive sublayer, a gas barrier sublayer, and an infrared reflection sublayer adapted to minimize heat loss from the airship.

An additional benefit of a sandwich structure comprising at least one microlattice layer and two gas barriers becomes apparent when one considers the process by which lifting gas will diffuse through an undamaged hull. Lifting gas (e.g., hydrogen) will diffuse through the inner gas barrier into the thin shell, between the two gas barriers, represented by the microlattice. The gas in this thin shell will, in general, be a mixture of lifting gas and normal atmospheric gases. The partial pressure of lifting gas, in this thin shell, will be less than the partial pressure of lifting gas in the interior of the balloon, but greater than the partial pressure of lifting gas in the outside atmosphere (where it is essentially zero). Thus, if nothing else is done, the lifting gas will also diffuse through the outer gas barrier and be lost. The rates at which the lifting gas will diffuse, through each of the (at least) two gas barriers, depends on the material and construction of the gas barriers and the difference in partial pressures on the opposite sides of each barrier. For an extremely long-endurance mission, any lifting gas lost to the outside atmosphere must ultimately be replenished from internal stores or external resupply.

In order to assemble an entire balloon or airship with hull material built in a sandwich structure as described above, individual "segments" or "gores" can be assembled with the gas barriers extended laterally and bonded together as illustrated in FIG. 1B. The gas barriers 102 and 106 are bonded together into flanges 108, which can in turn be bonded to flanges from adjacent "segments" or "gores" assembled in a similar manner. While the gas barriers are shown as separated from the microlattice in FIG. 1B, in many embodiments the gas barriers will be bonded to the surfaces of the microlattice 104. This avoids snagging and tearing of the gas barriers on small imperfections of the microlattice. Each segment or gore can have variable cross-sectional width along its length (for example, "pumpkin lobe" shaping), in order to allow proper shaping of the balloon or airship as a whole. The flanges can be reinforced with additional material of the same or different type, and reinforcing structures can also be applied transverse to the strips or gores i.e., spanning multiple gores).

Figure 1C:
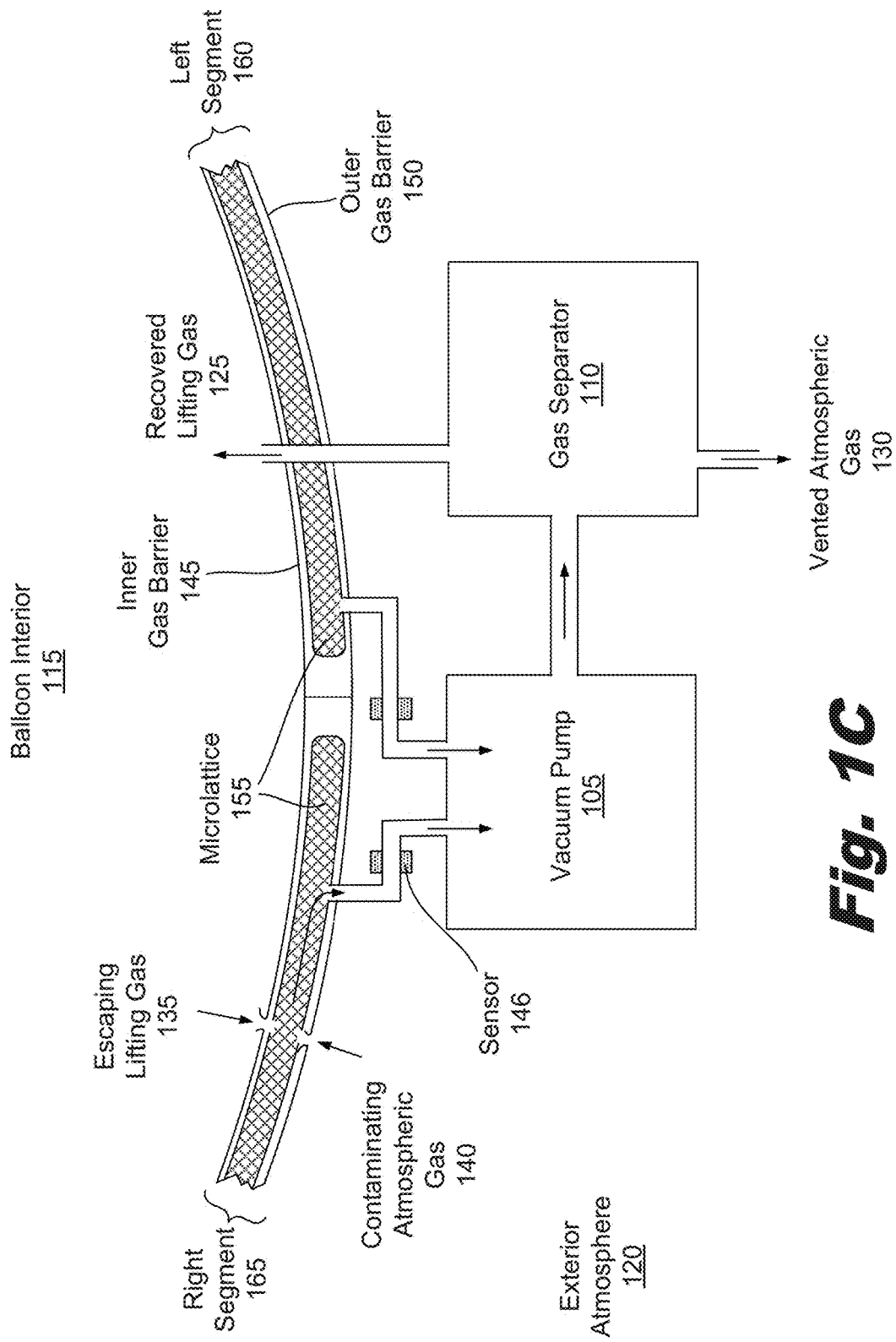
FIG. 1C shows an illustrative system for detecting leaks in a balloon and recovering lifting gas, according to one example of principles described herein.

FIG. 1C shows a system for detecting leaks in a balloon or airship and recovering lifting gas. This figure shows a portion of the airship hull which includes an inner gas barrier 145, an outer gas barrier 150, and a microlattice 155 sandwiched between the gas barriers. The thicknesses of these layers have been greatly enlarged for purposes of illustration. As discussed above, an airship hull may be formed from a number of joined sections 160,165. The sections are separate sealed compartments. The airship may be formed from a number of these sections joined together. In an undamaged airship, there is no route for gas to pass between the sections except by permeation through the gas barriers. For simplicity, only two sections are illustrated in this figure, a left section 160 and a right section 165 ("left" and "right" being referenced to an observer located on the inside of the airship).

The system includes a vacuum pump 105 which is connected to each of the sections 160, 165. The output of the vacuum pump 105 is connected to a gas separator 110 which separates the lifting gas from atmospheric gas or other contaminants. The separator may use a variety of systems for gas separation including membrane diffusion, centrifuge, adsorption, absorption, or distillation techniques. For example, membrane diffusion may be performed using palladium, ceramic, or synthetic membranes. The vacuum pump 105 and gas separator 110 are here shown as being located outside the outer gas barrier 150, but could also be located inside the inner gas barrier 145.

The vacuum pump 105 pumps out gas from the sections. It will be appreciated that the pressure in the sections is already rather low (for the case of a stratospheric system), the balloon is large, the sections are thin, and the microlattice structure itself represents a barrier to movement of the gas through the lattice structure. Hence the vacuum pump may not evacuate the gas very quickly. Nevertheless, it will tend to evacuate the gas more quickly than it can diffuse through the outer gas barrier (at least locally, near the point at which the vacuum pump is connected to the thin shell volume). Multiple points of attachment (i.e., of the vacuum pump to the thin shell volume), located across the hull, can be used to more efficiently evacuate the mixture of gases from the thin shell volume. Because of the action of the vacuum pump, the pressure in the thin shell volume will tend to be lower than that of the balloon interior, and possibly even lower than the outside atmosphere. The difference in pressure will lead to a compressive force on the microlattice, but this can be sustained by a microlattice designed with this constraint in mind. Additionally, this compressive force can at least partially compensate for tensile stresses experienced by the microlattice and gas barriers.

The gas extracted by the vacuum pump from the thin shell sections can be separated into its constituent parts to isolate the lifting gas (e.g., hydrogen) from the ambient atmospheric gases (primarily nitrogen and oxygen). The gas separator 110 receives the output from the vacuum pump and separates the lifting gas from the atmospheric gas. The hydrogen can be re-introduced to the lifting volume of the balloon, and the nitrogen and oxygen can be vented to the outside atmosphere. In this way, the overall rate at which lifting gas is lost to the outer atmosphere can be substantially reduced.

Identifying Hole Location

Regardless of the hull construction type (three generic types were described above: 1) a generally uniform hull material with no particular rip-stop features; 2) a hull material that incorporates rip-stop features such as texturing or embedded fibers; and 3) a hull comprising a sandwich structure with one or more layers designed as a gas barrier, and one or more layers designed as a tensile mat or web), small holes may occasionally occur. When a hole occurs, it must be located and patched in a timely manner (else the lifting gas will eventually be lost). Two methods (among others) that can be productively employed to identify a hole and its location are: a) photographic or video observation (e.g., with a camera) using ambient or artificial light; and b) active probing with a scanning laser such as a lidar system. In certain cases, other methods may be used. For example, in the case of a hull sandwich structure comprising an electrically conductive material such as nickel, electrical or electro-magnetic measurements (including radar) may be used to identify and locate a hole that is large enough to have damaged the microlattice structure (although such measurements might not identify a small hole in a gas barrier, where there was no damage to the microlattice structure).

The system shown in FIG. 1C can be used as a leak detector. FIG. 1C shows a hole in the right section 165 that has penetrated through both the outer gas barrier 150 and the inner gas barrier 145. Escaping lifting gas 135 enters the section from the balloon interior 115 and contaminating atmospheric gas 140 enters the section from the exterior atmosphere 120. Because the vacuum pump 105 is pumping gas out of the right section 165, a portion of the escaping lifting gas 135 and the contaminating atmospheric gas 140 is captured and drawn into the vacuum pump 105. This reduces the contamination of the lifting gas in the balloon interior and minimizes the amount of escaping lifting gas 135. As the combination of escaping lifting gas 135 and contaminating atmospheric gas 140 enters the vacuum pump 105 through a vacuum line, it is sensed by a sensor 146. A variety of sensors can be used to sense airflow into the vacuum pump, such as a mass flow sensor, a simple spectrometer or other suitable sensor. The information from the sensors can be used to detect the amount and possibly the composition of gas entering the vacuum pump. The amount of gas indicates the level of integrity of the section to which the vacuum pump is attached. High gas flow rates indicate that the section may have been compromised while low gas flow rates indicate a higher level of section integrity. The gas flow rates can be directly correlated to the size and/or location of a rupture. For example, if there are two vacuum lines attached to the section in different places, the general location of a leak along a section can be determined by comparing the mass flow rates in the two vacuum lines. In this example the leak is comparatively closer to a first vacuum line than a second vacuum line. Consequently, the first vacuum line will have a higher flow rate and the second vacuum line will have a lower flow rate because of the greater distance the gasses have to travel through the microlattice to reach the second vacuum port.

Gas composition in the vacuum line can be used to indicate whether the inner or outer gas barriers are ruptured (or both). For example, if the gas in the line is primarily hydrogen or helium, it can be assumed that the outer gas barrier is intact. If the gas composition in the vacuum line is primarily contaminating atmospheric gas, the outer gas barrier has probably been ruptured, but the inner gas barrier is intact. In the example shown in FIG. 1C, the sensor 146 detects a relatively large volume of gas with a composition that is a mixture of atmospheric gas and lifting gas. Thus, it can be concluded that a rupture has occurred that passes through both the inner and outer gas barriers in the right section 165. In contrast, relatively low gas volumes are received from the left section 160, indicating the left section has not been compromised. The separator directs recovered lifting gas 125 into the balloon interior 115 and vents atmospheric gas 130 back out into the exterior atmosphere 120.

The schematic diagram shown in FIG. 1C is intended to show one example of principles described and is not limiting. A variety of other configurations could be used. For example, the vacuum pump may be on the interior of the balloon and/or may be connected to each section in two or more positions.

Figure 2A:
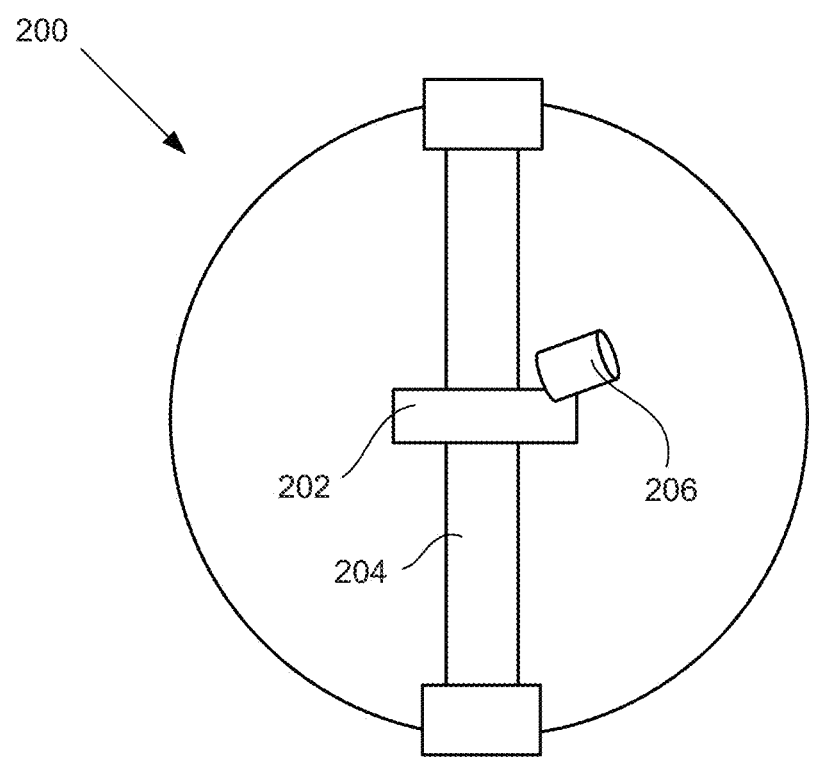
FIG. 2A illustrates a roughly spherical airship with a central structure comprising a rotating stage and an articulated camera, according to one example of principles described herein.

FIG. 2A illustrates in schematic form a roughly spherical or pumpkin-lobed balloon (airship) 200 with a central structure 204 to which a rotating stage 202 with an articulated still or video camera 206 has been attached. By rotating the stage 202, and pointing the camera 206 up and down, the entire hull surface can be examined from the center of the balloon thereby identifying holes that are large enough to be seen from that location. An alternative embodiment dispenses with the rotating stage and instead mounts a plurality of cameras with left-right as well as up-down articulation capability in roughly the same location, such that their fields of regard overlap and jointly cover the entire hull. The camera(s) may have zoom capability, i.e. to allow more detailed examination of the hull, and are not limited to visible light. Subsystems for power supply, pan/tilt (and optionally zoom), data handling, command and control, and the like are assumed to be present and are not further discussed. An auxiliary light source, either white light or wavelength(s) tailored to maximize contrast between the hull and a hole (where no hull material exists), may optionally be included. For balloons that include a microlattice layer, exposure of the microlattice through a tear in the membrane could be sensed by differences in light reflection. The light source(s) may be fixed or articulated, and may be separate from the camera(s) or integrated with the camera(s).

Distinctive markings may optionally be placed on the hull to unambiguously identify the section of the hull contained in a camera field of view, and also the relative hole location.

In an alternative embodiment, the camera(s) are replaced by a lidar system tailored to measure the range of the hull material from the sensor. Preferably, the hull and the lidar are designed or selected together so that the hull material reflects a portion of the incident light, thereby enabling a range measurement at the sensor. Since a hole will not reflect the incident light from the lidar, hole locations can be identified. The lidar can also be used to measure broad distortions of the hull, potentially allowing preventive maintenance in the event that a weakened section is identified.

Figure 2B:
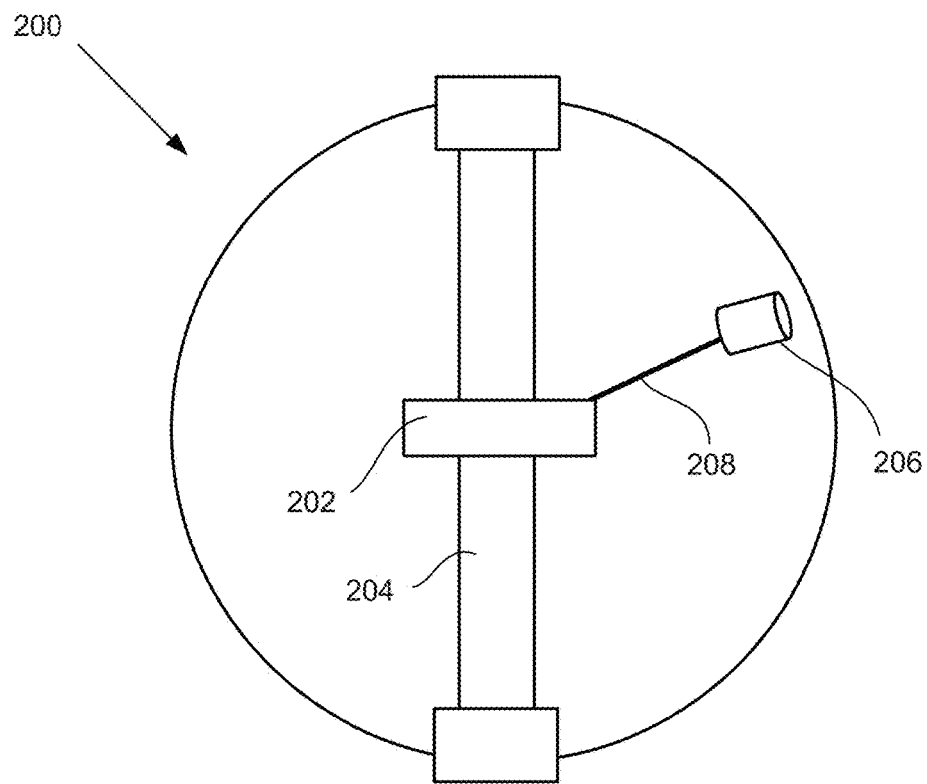
FIG. 2B illustrates a roughly spherical airship with a central structure comprising a rotating stage, articulated arm, and camera, according to one example of principles described herein.

FIG. 2B illustrates an alternative embodiment 200 where a camera 206 is mounted on an articulated arm 208 that can bring it into close proximity with the interior surface of the hull. The arm 208 articulates at the rotating stage 202 to allow the camera 206 to be scanned up and down (i.e., substantially from "pole to pole") within the balloon. Optionally, the camera 206 is also articulated at its point of attachment to the arm 208, allowing up-down as well as right-left camera pointing. One or more tension lines can be used to support the free end of the articulated arm 208, and provide for additional degrees of motion control. The combination of the rotating stage, articulated arm, and camera, allows the hull to be examined in close proximity. This embodiment is expected to be able to identify smaller holes than the embodiment illustrated in FIG. 2A, but may require greater amounts of time to completely examine an entire hull. This general concept can be extended to dirigible-shaped and other substantially non-spherical airships by adapting the reach of the articulated arm, or providing for a plurality of such systems spaced apart within the airship (possibly within separate internal spaces or ballonets), or by mobilizing the subsystem so that it can be repositioned within the airship in order to support reliable observation over the entirety of the hull.

Figure 6:
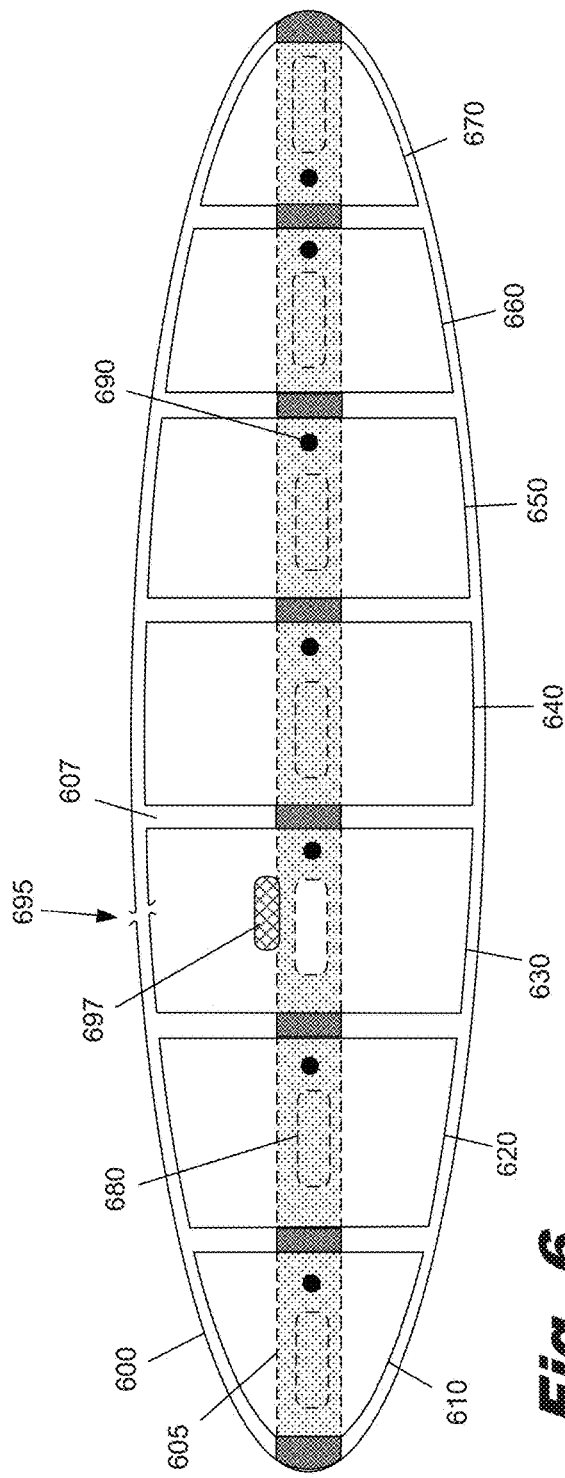
FIG. 6 is a schematic view of an airship with a longitudinal passageway that also serves as part of the structure of the airship, and several ballonets for lifting gas, according to some of the principles described herein.

FIG. 6 illustrates in schematic form a dirigible-shaped airship with outer hull 600 and multiple internal ballonets for lifting gas 610, 620, 630, 640, 650, 660, and 670. Also shown is a longitudinal hollow passageway 605 running the length of the airship, along its axis, passing through each of the ballonets. The cross-section of the passageway may be circular, rectangular, or some other shape, and is not required to be uniform over the entire length of the airship (although it could be). In some embodiments, the passageway is supported periodically along its length by guy wires running between the ballonets and out to the outer hull, which is assumed to represent a sufficiently rigid support based on the differential between the internal pressure of the airship and the outside ambient atmospheric pressure. In some embodiments, the passageway is spaced away from the longitudinal axis of the airship for at least a portion of its length—for example, it may run along the lower centerline or "keel" of the airship. The ballonets are sealed against the passageway so that each ballonet represents a separate airtight space for lifting gas. In some examples, the space 607 between the ballonets and between the ballonets and the outer hull can be filled with lifting gas or with atmospheric gas. The lifting or atmospheric gas may be at the same or a different pressure than the lifting gas in the ballonets. In one example, the space between the ballonets and the hull is filled with lifting gas that is pressurized above the ambient pressure and is substantially equal to the pressure in the ballonets. Consequently, there is little, if any, structural load on the membrane that makes up the ballonets during normal operation. Thus, the ballonet membrane can be designed to be substantially impervious to gases, but may be a lightweight material that is not required to have significant structural strength. The ballonets prevent mixing of the lifting gas with the atmospheric gases contained in the space 607 between ballonets, and between the ballonets and the outer hull. Also shown in FIG. 6 are a plurality of hatches 680 in the wall of the hollow passageway 605, one hatch per ballonet, which are operative to open and close. When closed, in a preferred embodiment, each such hatch would provide an air-tight seal preventing the free transfer of lifting gas between the ballonet in which it is contained and the interior of the hollow passageway 605. This allows the individual ballonets to be selectively filled (pressurized) and unfilled (depressurized). Finally, FIG. 6 illustrates in schematic form a plurality of cameras or other sensors 690 (shown as a set of black dots), disposed in each of the ballonets, for detecting holes in the ballonets as well as the outer hull proximate to the ballonet in which the camera or other sensor is disposed. While only one camera or sensor is illustrated in each ballonet, the reader will understand that multiple such cameras or sensors could be disposed in each ballonet, and the schematic illustration could also represent fixed or articulated sensors as discussed above. In an embodiment where there are no internal divisions or ballonets within the airship (or perhaps only a single large ballonet), a single camera or sensor can be mobilized along the passageway 605 such that it can be repositioned within the airship in order to avoid shallow look angles and support reliable observation over the entirety of its length.

Many alternative mechanical arrangements can be used to allow for maneuvering of a camera or other sensor so that it can observe substantially the entire inner surface of the balloon or airship.

In a system where the airship hull comprises a metallic microlattice, additional methods for identifying the presence and location of a hole are available. For example, a low-power radar operating in the EHF portion of the spectrum or above (i.e., above 30 GHz) could identify a range of small holes that represent damage to the microlattice structure and are large enough to be operationally significant.

As discussed above, in a system where the airship hull comprises a microlattice and a vacuum pump is connected to the individual sections through one or more interfaces for extraction of gases from the microlattice volumes, an increase in the flow of gas from a particular section (or interface) can be used as a diagnostic to detect the likely presence of a hole in that section (or near that interface).

Figure 2C:
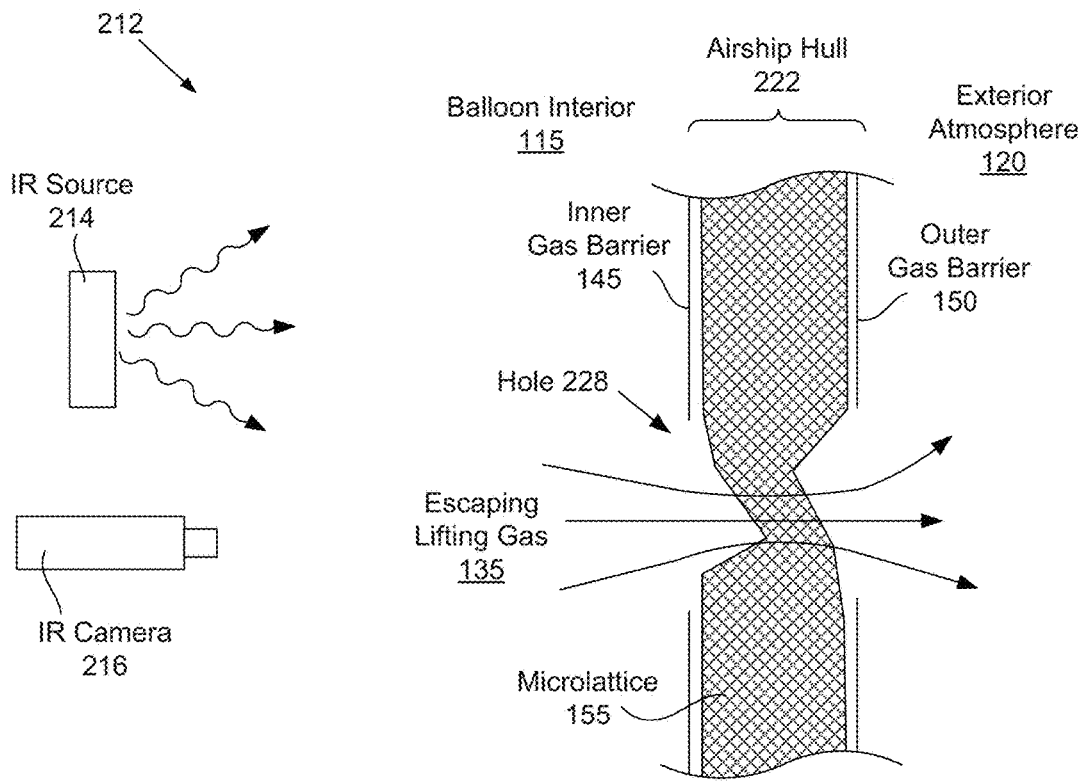
FIG. 2C shows a system for detecting leaks in an airship hull that includes a microlattice structure, according to one example of principles described herein.

FIG. 2C shows a system 212 for detecting leaks in an airship hull 222 that includes a microlattice structure 155. The system 212 includes an infrared OR) source 214 and an IR camera 216. The IR source 214 is used to heat up portions of the airship hull 222 while the IR camera 216 images the heated portions. In some embodiments, the IR source may be a quartz lamp or other electrically operated heat lamp that comprises a source of radiant heat. In other embodiments, sunlight may be used as the IR source. The right side of FIG. 2C shows a portion of the airship hull 222 that includes an inner gas barrier 145, a microlattice 155 and an outer gas barrier 150. The airship hull 222 has a hole 228 through which escaping lifting gas 135 passes. The hole 228 could have been formed in a number of ways, including impact from an exterior object, material fatigue, or stress. In general, the balloon interior 115 contains lifting gas at a higher pressure than the exterior atmosphere 120. Consequently, the lifting gas passes through the airship hull 222 and out the hole 228. Note that in implementations such as the embodiment illustrated in FIG. 6, where the outer hull is constructed with a microlattice, a hole in the outer hull would primarily allow for the escape of atmospheric gases from the internal space 607; however, the same event that caused the hole in the outer hull could have also caused a hole in one or more of the ballonets, and so the external hole may allow for the escape of a mixture of atmospheric gases as well as lifting gas). As the gas passes through the hole 228 it cools the microlattice 155 that it passes over. This convective cooling effect is strong enough to create significant temperature differences in the microlattice 155 even for small holes. The IR camera 216 may have a minimum resolvable temperature difference on the order of tens of millikelvins. Consequently, the IR camera 216 can image temperature differences caused by even small holes. Additionally, the IR camera 216 may be equipped with an optical filter that is tuned to emission/absorption lines in a gas. For example, carbon dioxide has a strong absorption line at IR wavelengths between 4 and 5 microns. This absorption can be used to directly image carbon dioxide leaking into an airship without internal atmospheric spaces (such as is illustrated schematically in FIGS. 2A and 2B), against the backdrop of the hull with its gas barrier(s) and its microlattice structure, using an IR camera with an appropriate filter.

Figure 2D:
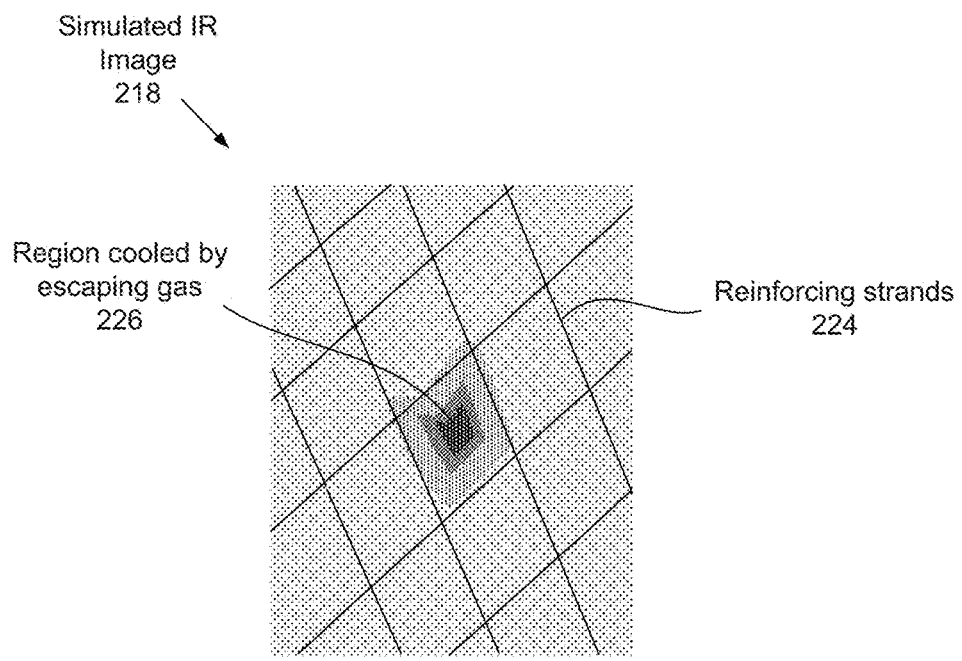
FIG. 2D is a simulated infrared image of cooling caused by lifting gas escaping through an airship hull, according to one example of principles described herein.

FIG. 2D is a simulated infrared image 218 of cooling caused by lifting gas (or atmospheric gases, or a combination) escaping from the airship. The region 226 is cooled by escaping gas and indicates the presence of a hole. After identifying a hole, the appropriate repair mechanisms can be used to patch the hole. Also visible in the image are reinforcing strands 224 that have limited the extent of the hole.

Maneuvering a Repair Mechanism

As described above, FIG. 2B illustrates an articulated arm with a camera or other sensor. This articulated arm can be adapted to carry a repair mechanism to a particular point of a balloon with a hole. In one embodiment, the same arm that carries a camera system also carries a repair system able to affect repairs to the hull when the arm brings it into close proximity to a hole. In another embodiment, a separate and independent arm is used for the repair mechanism versus the camera or other sensor.

In an embodiment as illustrated in FIG. 6, each ballonet may contain a dedicated maneuvering system that can support a repair mechanism, or a plurality of devices variously comprising one or several of a repair mechanism, camera, and other sensor(s). Alternatively, a single maneuverable and dexterous robotic device, adapted to carry one or several repair mechanisms and sensors, can use the passageway 605 with its hatches 680 to move between ballonets. Once located proximate to the hatch associated with a ballonet requiring repair, the hatch could be opened in order to allow the robotic device 697, or a portion of the robotic device, to maneuver itself out of the passageway and into the ballonet. If the entire robotic device maneuvers itself out of the passageway, it may perch itself on the outside of the passageway in order to perform its work (deriving power either from an internal battery or a power source on the outside of the passageway). This allows the hatch to be closed while the robotic device performs its work. However, in other embodiments only a portion of the robotic device maneuvers itself out of the passageway, and the robotic device remains supported by the interior of the passageway or structures located in the interior of the passageway. In such an embodiment, power can be provided by an internal battery, umbilical cable (which may also be adapted to carry digital signals to and from the robotic device), or electrified rails. The ballonet with its open hatch will be fluidically connected to the interior of the passageway, but the various ballonets can still be selectively filled (pressurized) and unfilled (depressurized) as long as the other hatches remain closed.

REPAIRING THE HULL

In one embodiment, the repair mechanism is an automated tape dispenser that is adapted to apply at least one length of adhesive tape on the inside surface of the hull or ballonet such that it covers the hole in the lifting gas enclosure subject to repair.

Figure 3:
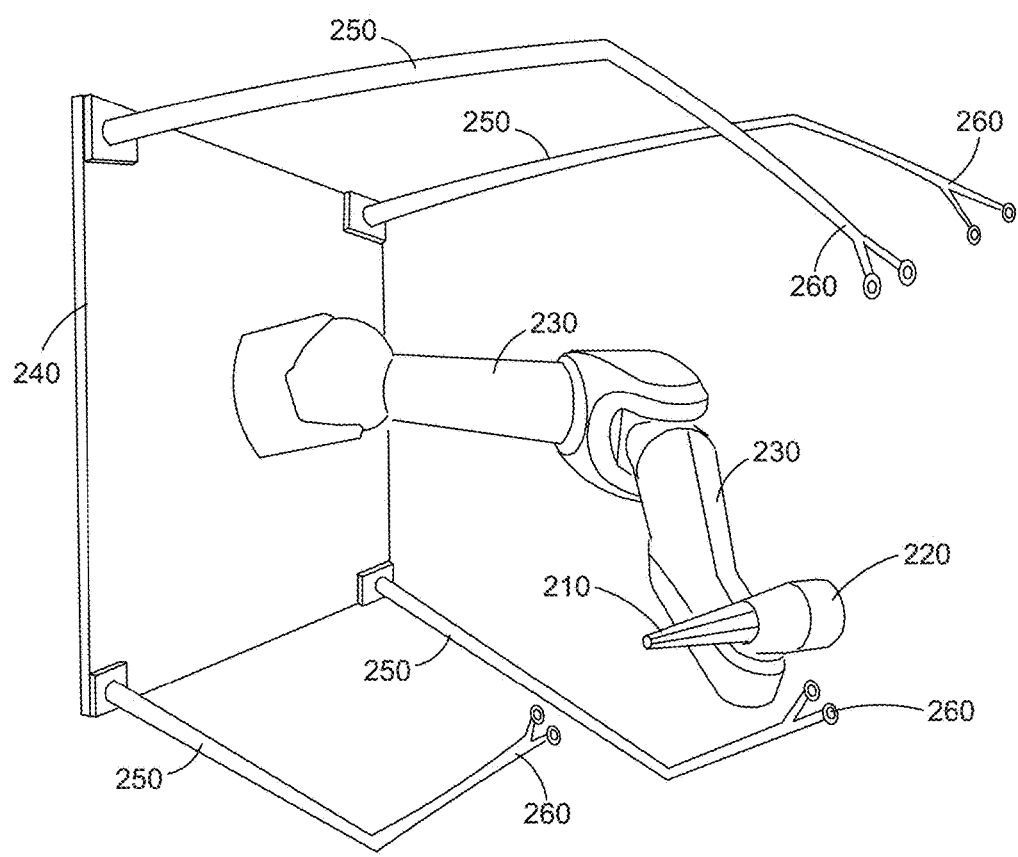
FIG. 3 illustrates a manipulator arm with a repair mechanism, according to one example of principles described herein.

In another embodiment, as illustrated in FIG. 3, the repair mechanism comprises an adhesive spray applicator 210 and a patch applicator 220 both attached to a dexterous manipulator arm 230 such that they can be separately brought to bear on the hole subject to repair. The dexterous manipulator arm 230 is attached to a baseplate 240 which is itself mounted on a manipulator arm (not shown) similar to that illustrated in FIG. 2B. In operation, the adhesive spray applicator 210 is first brought to bear and sprays an adhesive around the hole; then the patch applicator 220 is brought to bear and a patch is applied over the hole and its surroundings, said patch being held in place by the previously-applied adhesive. Preferably, the same adhesive, or a secondary material that can serve as an adhesive caulk or gap-filler, is then sprayed around the edges of the patch to seal the edges and prevent leakage of lifting gas. If a secondary material is used, it may be applied by the same spray applicator 210 (assuming the spray applicator is adapted to accommodate multiple reservoirs of material), or a different spray applicator not shown.

Preferably, although it is not a strict limitation of the invention, the adhesive is pliable rather than brittle. It should be designed to operate in the relevant environment (hydrogen atmosphere; expected temperature range) and "set" within a suitable amount of time—on the order of minutes to a few hours. Total cure time can be longer. Also preferably, the tape or patch has rounded corners to minimize buildup of stress in the hull or ballonet material adjacent to the tape or patch.

Figure 4A:
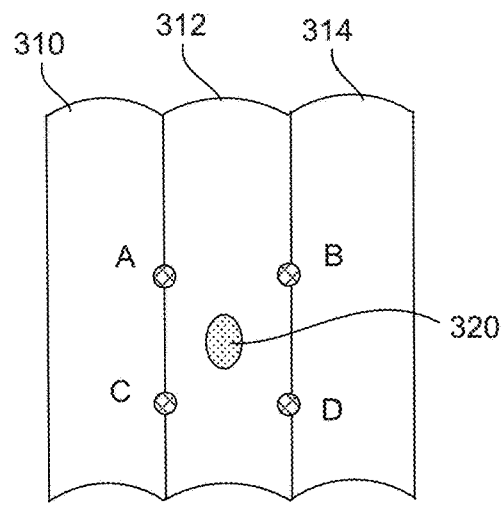
FIG. 4A illustrates a portion of an airship hull with a hole in it, according to one example of principles described herein.

In order to ensure reliable placement of the repair tape or patch, and also cater to a gas-tight seal, it is desirable to stabilize the repair mechanism relative to the hole subject to repair and also ensure that the hull material (in the case of a single-walled airship) or ballonet material (in the case of an airship with ballonets) is stretched flat prior to placement of the tape or patch. One way to achieve this is to equip the repair mechanism with a set of dexterous fingers or grippers 260, generally surrounding the tape dispenser or adhesive/patch dispenser, that are adapted to gently engage the hull or ballonet material around the hole and spread the material until it is in tension around the hole, thereby ensuring a relatively flat and stable surface upon which to apply the tape or adhesive/patch combination. In FIG. 3, hardware to achieve this function is illustrated schematically as a plurality of manipulator arms 250 and grippers 260 located at the corners of the baseplate 240 (although other arrangements are feasible and within the scope of the invention). The manipulator arms 250 are adapted to allow the positioning of the grippers 260 within a commandable 3D volume referenced to the baseplate 240, thereby allowing the grippers 260 to engage the hull or ballonet material at a plurality of points and pull it taut in preparation for repair by the central manipulator arm 230 with its repair head (which, in this illustration, comprises a spray applicator 210 and patch applicator 220). In one embodiment for a pumpkin-lobed balloon design, recognizing the relative delicacy of the hull material, the grippers 260 have soft knobbed end points as illustrated in FIG. 3 and are adapted to engage the strengthened longitudinal joints between the lobes of the balloon (the sections) as illustrated in FIG. 4. Here, gores 310, 312 and 314 represent three adjacent sections of a pumpkin-lobed balloon wherein a hole 320 exists and has been identified in the middle of section 312. In order to spread the hull material around the hole and provide for a relatively flat and stable surface with a moderate degree of tension, grippers engage at the four points labeled A, B, C and D and tug gently away from the hole, thereby placing the damaged section under tension. This stabilizes the location of the repair relative to the repair mechanism (thereby catering to precise placement), and provides a relatively flat hull surface for application of the repair tape (or patch) such that an air-tight seal is more easily achieved. Grippers can be designed generally along the lines of opposing fingers, forceps, pliers, or other suitable device.

The above discussion of repair techniques applies to single-volume balloons without a microlattice hull structure, as well as repair of the inner gas barrier in single-volume balloons that comprise a microlattice hull structure. However, in such a system, it is also beneficial to patch the outer gas barrier or the microlattice structure itself. This will prevent the escape of lifting gas contained within the thin shell volume between the two (or more) gas barriers, and prevent the incursion of atmospheric gases into the shell volume (which over time could overload a vacuum pump designed to evacuate gases from that volume). Accordingly, in one embodiment, the repair mechanism of the inventive concept is further adapted to inject a quick-setting foam into the microlattice structure (e.g., using a syringe), at several locations spaced around the hole, so as to surround the hole with an annular barrier that substantially prevents the flow of gas into and out of the microlattice structure through the damaged section. At each point of injection, the foam will spread out and fill the interstices in the microlattice structure between the inner and outer gas barriers—incidentally also blocking the flow of gas through the tiny hole in the inner gas barrier at the point of injection. While the foam barrier could be built-up either before or after the repair of the inner gas barrier, it is preferable to repair the inner gas barrier first (thereby eliminating the rapid outflow of gas).

Figure 4B:
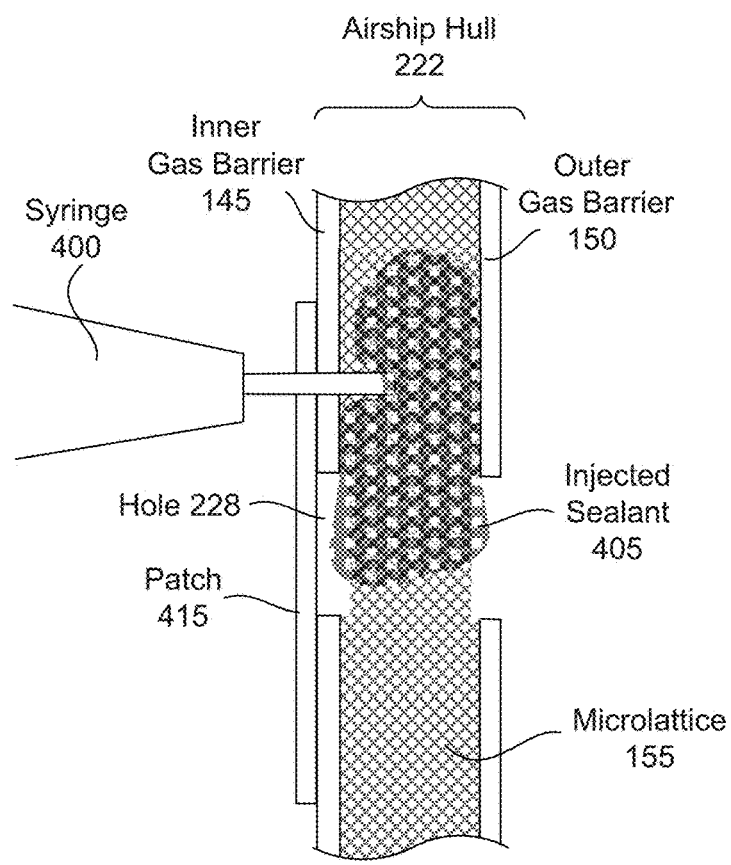
FIG. 4B shows a cross section of a hole in an airship repaired with a patch and injection of sealant, according to one embodiment of principles described herein.

FIG. 4B shows across section of an airship hull 222 with a hole 228 repaired with a patch 415 and injection of sealant 405. As discussed above, the patch 415 is first adhered to the inner gas barrier 145. A syringe 400 pierces the patch 415 and/or the inner gas barrier 145 and injects the sealant 405 into the microlattice 155. The injected sealant 405 can be a variety of materials that cure under appropriate conditions. For example, the sealant 405 may be a two part epoxy that is mixed prior to injection, UV cured sealant, heat curing sealant, expanding foam, or other sealant. In some embodiments, the sealant may fill the hole, bond to the patch, inner gas barrier, outer gas barrier, and microlattice.

Multiple Sets of Sensors

In one embodiment, two sets of sensors are used to identify holes in an airship hull or ballonet. A centrally-located sensor, or plurality of sensors, as illustrated generally in FIG. 2A, is used to rapidly and repeatedly scan the inner surface of the hull or ballonet and locate moderate to large holes not visually obstructed by other internal structures of the system. Separately, a close-up sensor on an articulated arm (as illustrated generally in FIG. 2B), which optionally also hosts a repair mechanism, is used to slowly scan the inner surface of the hull or ballonet at higher resolution, thereby allowing the system to identify smaller holes that cannot be reliably seen or reliably identified by the centrally-located sensor or sensors. In an embodiment where the articulated arm hosts both a sensor and a repair mechanism, tasking for the arm and its end effectors should be prioritized such that the highest priority is to repair a large hole as soon as such a hole is identified, a secondary priority is to repair a small hole, and a tertiary priority is to scan for small holes (i.e., when the arm is not otherwise tasked with repair activities). In such an embodiment, the sensor is optionally used to provide for fine registration and feedback control of the repair mechanism to ensure accurate placement of the repair tape, adhesive/patch combination, or other repair materials (such as precise placement of a syringe for injection of a foaming agent into a microlattice structure to which the inner gas barrier is bonded).

Preferably, the tasking is preemptive such that a high priority task (i.e., repairing a large hole) can interrupt a lower priority task (i.e., an ongoing repair of a smaller hole). However, in an alternative embodiment an ongoing repair will be finished before the higher priority task is initiated.

Additional Considerations and Embodiments

A foaming agent may be added to the spray adhesive previously described, to create a thicker layer of adhesive around the hole, also minimizing the likelihood of long unfilled "ripples" between the hull or ballonet material and patch that could allow lifting gas to escape despite the repair. In a system that comprises an injectable foaming agent for blocking gas flow in a microlattice structure, the foaming agent added to the spray adhesive could be the same or different from the foaming agent used to create a barrier to the flow of gas in the microlattice structure.

In order to mitigate the effects of atmospheric gases which leak into the balloon or ballonet(s) through macroscopic holes, as well as through diffusion, the airship can include a "scrubber" for nitrogen and oxygen. The scrubber can use any of several technologies to separate and isolate the trace amounts of nitrogen and oxygen inside the balloon or ballonet(s)—such as: cryogenic cooling (both nitrogen and oxygen condense at higher temperatures than hydrogen); centrifugal separation (nitrogen and oxygen molecules are substantially heavier than hydrogen molecules); chemical scrubbing; and semi-permeable membranes. After separation and isolation, the unwanted gases can be vented to the atmosphere. In a system comprising a hull with a microlattice structure and multiple gas barriers (at least an inner and outer), such a scrubber can be used alone (i.e., operating only inside the primary lifting volume of the balloon) or in conjunction with a vacuum system that also extracts gases from the thin shell regions between the gas barriers.

Figure 5:
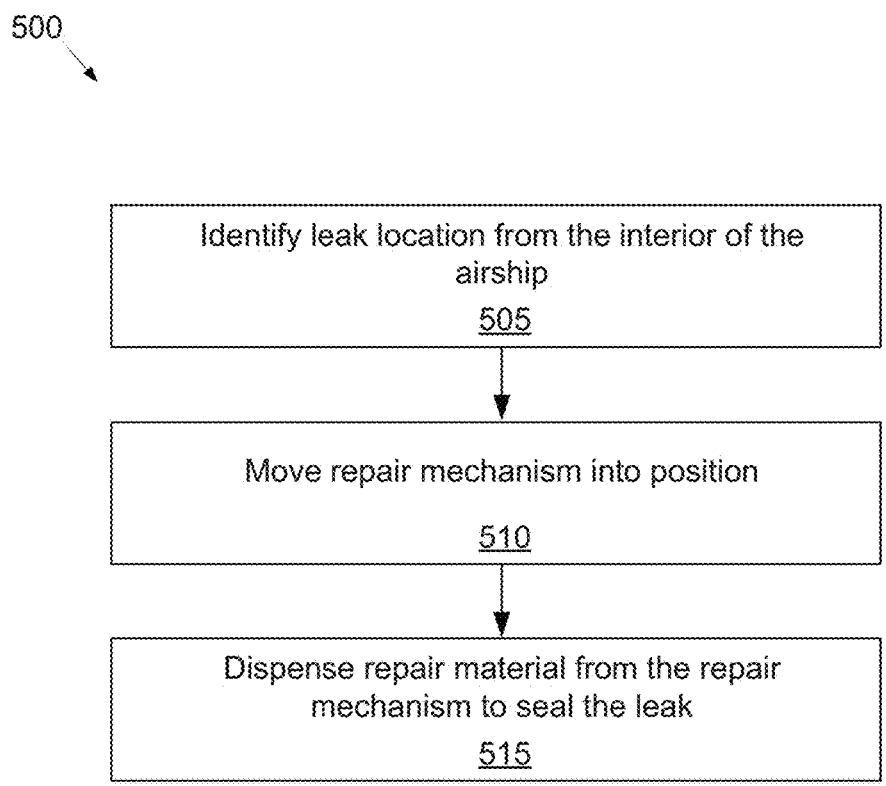
FIG. 5 is a flow chart of an illustrative method for in situ airship repair, according to one example of principles described herein.

FIG. 5 is a flow chart of an illustrative method 500 for in situ airship repair. A leak location is identified from the interior of the airship (block 505). A variety of methods could be used to identify the leak location, including feedback from gas sensors on vacuum lines, IR cameras, visual inspection, lidar, radar or other suitable inspection technique. Additionally, multiple inspection techniques can be used together to more accurately and quickly identify a leak or other structural problem.

The repair mechanism is moved into position (block 510) and repair material is dispensed from the repair mechanism to seal the leak (block 515). As discussed above, the sealing may be performed using tape, foam, adhesive/patch, or other sealant. For example, adhesive may be dispensed over the portion of the inner gas barrier with the leak and a patch placed onto the adhesive. In other embodiments, foam or other sealing material can be injected into the microlattice. After repairing the identified leak, the repair system again scans the interior of the airship for additional leaks.

In an airship comprising an outer hull and multiple ballonets for lifting gas, such as a dirigible-shaped airship using pressurized ambient air to maintain its shape and multiple internal ballonets for lifting gas spaced along its length, one or a plurality of "spare ballonets" may be used in lieu of the repair techniques discussed above, or in an embodiment that can repair small holes but not large ones, to mitigate severe damage beyond the capability of the repair techniques to overcome. These spare ballonets would remain unfilled and stowed or folded during normal operations prior to incurring damage to a filled ballonet. After damage to a filled ballonet is sustained, a suitably-placed spare ballonet (i.e., close to the failed ballonet) is inflated from the remaining gas in the damaged ballonet, or a pressurized reservoir of lifting gas, or an external source, or some combination of these, thereby functionally replacing the damaged and now deflated ballonet. If the ballonets are designed to press against the outer hull when filled to an overpressure condition, the spare ballonet, or the spare ballonet and the remaining filled ballonets, can be so filled, and thereby help to stabilize the outer hull until it can be repaired, or until the airship can be returned to the ground for servicing. Alternatively, the airship and its pump(s) for ambient air may be able to maintain suitable operating pressure despite a hole in the outer hull.

In an airship comprising an outer hull and multiple ballonets for lifting gas, such as a dirigible-shaped airship using pressurized ambient air to maintain its shape and multiple internal ballonets for lifting gas spaced along its length, where each ballonet contains a sensing and repair mechanism as described earlier (or where a suitable device can be maneuvered into a damaged ballonet), an augmented inventive method and associated apparatus can be used to mitigate damage to the outer hull as well as the ballonets. In the augmented method, the ballonets are designed to press against the outer hull and adjacent ballonets when fully inflated (note: as illustrated in FIG. 6, the ballonets are not required to be fully inflated and pressed against the outer hull under normal operational conditions, although they may touch over a portion of their surfaces). Thus, when a ballonet is damaged, the first step is to inflate the damaged ballonet until it presses against the outer hull and adjacent ballonets. Note that a single damaging event, such as a micrometeorite strike or bullet, may affect multiple ballonets as well as the outer hull. Note further, that depending on the detailed design of the airship and its ballonets, and the location of the damaged ballonet(s), some or all of the undamaged ballonets may also need to be more fully inflated in order to ensure that the damaged ballonet(s) press(es) against its neighbors. While inflating the one or several damaged ballonets may be counterintuitive, it provides a stabilized surface to support repair by the sensing and repair mechanism(s) contained in the damaged ballonet(s). This approach also reduces the rate at which ambient pressurized air is lost through the hole(s) in the outer hull, and possibly enters the ballonets, since the flow of pressurized air between the ballonets and the outer hull is restricted, and the damaged ballonets are pressurized to minimize the inflow of unwanted gasses. A sensing and repair method and apparatus as previously described can then be used to repair the damaged ballonet in which the apparatus resides. An augmented sensing and repair mechanism can also repair the outer hull, if the ballonet in which it is located happens to be pressed against a hole in the outer hull (note that this may be the damaged ballonet or an undamaged ballonet). This is achieved by locating the hole in the outer hull using previously-described techniques (or other techniques known to those of skill in the art) and placing a reinforcing patch, or several reinforcing patches, on the inside of the ballonet at the location of the hole in the outer hull. The augmented sensing and repair mechanism then uses a suction apparatus to pull the reinforced section of ballonet away from the outer hull, injects a foaming adhesive and sealer through the reinforced section to the space between the ballonet and the outer hull, and then releases the suction to allow the reinforced section to press once again against the outer hull, sandwiching the foaming adhesive and sealer between the outside of the reinforced section of the ballonet and the inside of the outer hull. This bonds the reinforced section of ballonet to the outer hull, which seals and reinforces the outer hull at the location of the hole. Following repair of the ballonet(s) and outer hull, the ballonets can be deflated to their normal operational size by pumping some of the lifting gas into other ballonets, venting some of the lifting gas to the atmosphere, or recompressing it into an onboard reservoir. This substantially restores the desired buoyancy characteristics of the airship. The ballonet will tend to pull away from the outer hull, except where it is reinforced and bonded thereto. In some embodiments, lifting gas that is lost during the repair process can be resupplied from another airship.

The method just described can be adapted to an embodiment with a single maneuverable and dexterous robotic device that can maneuver from one ballonet to another as described previously (e.g., through a passageway that communicates with each of the ballonets). In such an embodiment, the single robotic device repairs each damaged ballonet as well as the one or several holes in the outer hull.

In a repair method that involves the over-inflation of one or more ballonets, the airship as a whole will tend to become more buoyant until the ballonets are subsequently deflated. This can be mitigated, in some embodiments, by adjusting dynamic lift associated with the airship, or by the application of vectored thrust, or by providing increased tension on a tether extending to a lower airship or the ground. Further, in an airship that contains more than three ballonets, the number of ballonets that require full inflation can generally be limited to three or less (for a single damaged ballonet). This is achieved by first inflating the one or two ballonets that are adjacent to the damaged ballonet, essentially "locking" these one or two ballonets in place due to friction between them and the outer hull. The damaged ballonet can then be inflated. If the excess lifting gas used to inflate these ballonets is taken from ballonets that do not need to be inflated (i.e., they are further from the damaged section), the "supplying ballonets" can be deflated while the "receiving ballonets" are inflated, and the overall buoyancy of the airship can be minimally affected (although the trim characteristics may be affected, and of course a small amount of lifting gas is continually being lost until ballonet repairs are completed).

In a repair that results in the bonding of a ballonet to the outer hull, the subsequent deflation of the ballonet will result in the ballonet remaining locally attached to the outer hull. There will be some local stress on the ballonet, but this can be compensated (and the subsequent integrity of the ballonet maintained) by ensuring a sufficiently large reinforced area.

In an embodiment such as is illustrated schematically in FIG. 6, the passageway 605 can be adapted to serve as a plenum for distribution and redistribution of lifting gas. For example, with a single reservoir of lifting gas connected to the interior of the passageway through a controllable valve, and separate controllable valves connecting the interior of the passageway to each of the ballonets, the valves can be operated to deliver lifting gas to a selected ballonet or several ballonets. Similarly, if a pump is provided to compress lifting gas from the passageway and store it in the reservoir, the valves and pump can be operated to deflate a selected ballonet (or several ballonets) and compress the lifting gas for storage in the reservoir. The hatches 680, illustrated in FIG. 6, represent a set of simple large-aperture valves; however, a more traditional set of valves that are separate from the hatches, and separately controllable, may also be used.

A single reservoir of lifting gas, and a single pump, operated as described above, can sequentially inflate and/or deflate one or several ballonets in accordance with the repair methods described previously. If greater speed is desired, simultaneous deflation of one or several ballonets, and inflation of one or several other ballonets, can be accommodated if a pump and valve assembly is associated with each ballonet separately. This allows lifting gas to be pumped out of the ballonet(s) intended to be deflated, while simultaneously delivering the lifting gas to the ballonet(s) intended to be inflated. In one such embodiment, one-way pumps move lifting gas from the ballonet(s) intended to be deflated, and the previously-described hatches are used as a set of simple large-aperture valves for the ballonet(s) intended to be inflated.

Figure 7:
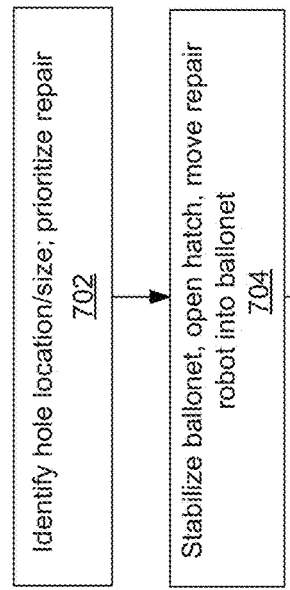
FIG. 7 is a flowchart of an illustrative method for in situ airship repair in an airship with multiple ballonets, according to some of the principles described herein.
Figure 7:
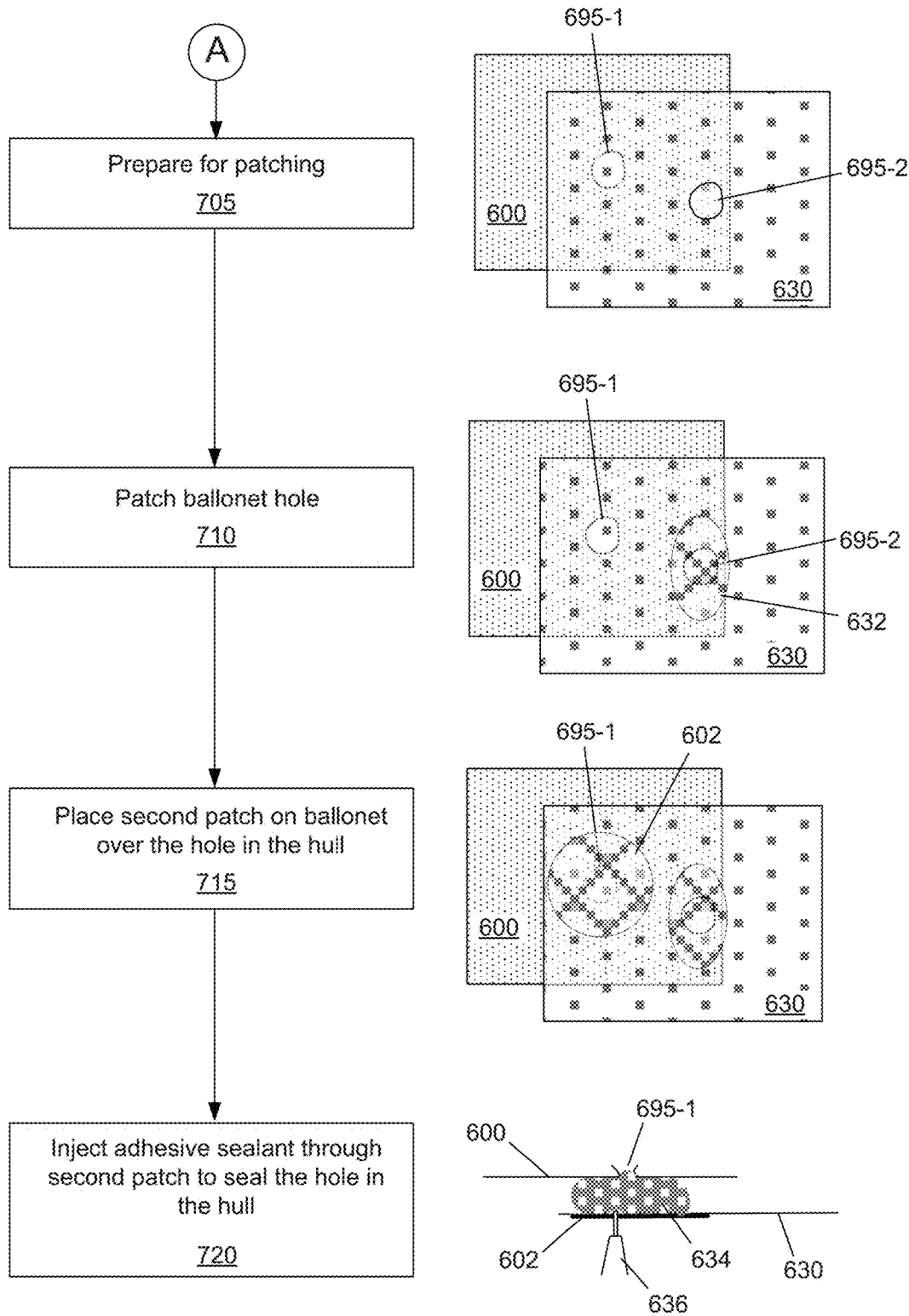

The flow chart of FIG. 7 summarizes an illustrative example of the process described above. A hole or holes in the ballonets/hull are identified by location and size and the repair priority is determined (step 702). In some situations, location and size of a hole may be directly measured, such as imaging the hole with a camera or other active sensor. In other situations, the location and size of the hole may be indirectly measured, such as measuring a pressure loss in a ballonet. Larger holes in the ballonets are given highest priority to prevent excessive loss of lifting gas and contamination of the remaining lifting gas in the ballonet with atmospheric gases. Other holes, such as smaller holes in the ballonets and holes in the hull are given lower priority. The location of the hole and operational events can also influence the prioritization of the repair. For example, a hole/tear that compromises the physical integrity of the airship may be given higher priority than a hole that doesn't have structural implications. The highest priority hole is selected for the first repair operation, followed by holes with lower priority.

The ballonet with a hole to be repaired is stabilized, the hatch is opened, and the robot or other repair mechanism is moved into the ballonet to make the repair (step 704). As discussed above, stabilizing the ballonet may include a variety of actions, pressurizing and/or shifting the ballonet. Pressurizing the ballonet may be accomplished in a variety of ways, including introducing additional lifting gas into the ballonet, introducing additional lifting gas into adjoining ballonets, decreasing the pressure in the hull (causing the ballonet to have a positive differential pressure), or other technique. Where a hole is in the hull, the system may be partially self healing. For example, as the pressure in the hull drops, the ballonets will expand due to the increasing pressure differential and may be pressed against the hole in the hull. This may slow the leakage out of the hull. In other cases, a projectile/meteorite may penetrate both the hull and the ballonet. Shifting the ballonet (for example, by inflating an adjacent ballonet) may serve to offset the hole in the ballonet from a corresponding hole in the hull. Pressurizing the ballonet against the surface of the hull then partially seals both holes until a repair can be performed.

The image to the right of block 705 illustrates a hole 695-1 in the hull 600 and a corresponding hole 695-2 in the ballonet 630. In this illustration, the ballonet 630 is shifted so that the holes are not aligned. This misalignment may be a result of the spacing between the ballonet and the hull during normal operation of the airship or may be a result of mechanical displacement of the ballonet. The ballonet has been pressurized to press the ballonet membrane against the hull and partially seal the holes. This prepares the ballonet and hull for patching (step 705).

The robot or other mechanism repairs the hole in the ballonet membrane (step 710). This may be accomplished in a variety of ways, including putting a reinforcing patch 632 over the hole and/or injection of sealant.

In this example, a second patch is placed on the interior surface of the ballonet in a location that corresponds to the hole in the hull (step 715). This reinforces this portion of the ballonet membrane so that it can serve as a patch for the hole in the hull 600. The repair robot 636 or other mechanism then injects adhesive sealant 634 through the patch 602 and over the hole in the hull (step 720). This seals the hole and adheres the ballonet membrane 630 over the hole 695-1. The adhesive/sealant also fills the injection hole after the repair mechanism is with drawn. The adhesive/sealant cures and the repair mechanism can be moved to the next hole location (if any).

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of repairing an airship hull of an airship during flight and while the airship is untethered from the ground, comprising:
   detecting a breach in a gas barrier bordering an interior volume of the airship, the airship containing a lifting gas;
   wherein the hull of the airship comprises an electrically conductive material and wherein the breach in the gas barrier is detected by detecting changes in an electrical conductivity of the electrically conductive material.

2. The method of claim 1, further comprising moving a repair mechanism into a position in proximity to the breach to dispense repair material from the repair mechanism to seal the breach.

3. The method of claim 2, wherein the repair mechanism receives instructions remotely from a user at a ground control station to move the repair mechanism.

4. The method of claim 2, wherein dispensing the repair material comprises dispensing tape from the repair mechanism onto an inner surface of the gas barrier of the airship hull.

5. The method of claim 2, wherein dispensing the repair material comprises:
   placing a patch over the breach in the gas barrier; and
   injecting a sealant into a spacer layer defined in the airship hull, the spacer layer interposed between an outside layer and an inside layer of the airship hull.

6. The method of claim 2, wherein the airship comprises at least one inner ballonet disposed within the hull, the method further comprising:
   pressurizing the ballonet; and
   moving the repair mechanism inside the ballonet to the location of the breach.

7. A method of repairing an airship hull of an airship during flight and while the airship is untethered from the ground, comprising:
   detecting a breach in a gas barrier bordering an interior volume of the airship by detecting changes in an electromagnetic signal reflected off of the hull, the airship containing a lifting gas.

8. The method of claim 7, further comprising moving a repair mechanism into a position in proximity to the breach to dispense a repair material from the repair mechanism to seal the breach.

9. The method of claim 8, wherein the repair mechanism receives instructions remotely from a user at a ground control station to move the repair mechanism.

10. The method of claim 8, wherein dispensing the repair material comprises dispensing tape from the repair mechanism onto an inner surface of the gas barrier of the airship hull.

11. The method of claim 8, wherein dispensing the repair material comprises:
   placing a patch over the breach in the gas barrier; and
   injecting a sealant into a spacer layer defined in the airship hull, the spacer layer interposed between an outside layer and an inside layer of the airship hull.

12. The method of claim 8, wherein the airship comprises at least one inner ballonet disposed within the hull, the method further comprising:
   pressurizing the ballonet; and
   moving the repair mechanism inside the ballonet to the location of the breach.

13. A method of repairing an airship hull of an airship during flight and while the airship is untethered from the ground, comprising:
   detecting a breach in a gas barrier bordering an interior volume of the airship using optical measurements, the airship containing a lifting gas;
   moving a repair mechanism into a position in proximity to the breach to dispense a repair material from the repair mechanism to seal the breach; wherein the repair mechanism receives instructions remotely from a user at a ground control station to move the repair mechanism.

14. A method of repairing an airship hull of an airship during flight and while the airship is untethered from the ground, comprising:
   detecting a breach in a gas barrier bordering an interior volume of the airship using optical measurements, the airship containing a lifting gas;
moving a repair mechanism into a position in proximity to the breach to dispense a repair material from the repair mechanism to seal the breach;
   wherein dispensing the repair material comprises:
      placing a patch over the breach in the gas barrier; and
      injecting a sealant into a spacer layer defined in the airship hull, the spacer layer interposed between an outside layer and an inside layer of the airship hull.

15. A method of repairing an airship hull of an airship during flight and while the airship is untethered from the ground, comprising:
   detecting a breach in a gas barrier bordering an interior volume of the airship using optical measurements, the airship containing a lifting gas;
   moving a repair mechanism into a position in proximity to the breach to dispense a repair material from the repair mechanism to seal the breach; wherein
   the airship comprises at least one inner ballonet disposed within the hull, the method further comprising:
   pressurizing the ballonet; and
   moving the repair mechanism inside the ballonet to the location of the breach.

16. A method of repairing an airship hull of an airship during flight and while the airship is untethered from the ground, comprising:
   detecting a breach in a gas barrier bordering an interior volume of the airship by measuring temperature variations across the gas barrier, the airship containing a lifting gas.

17. The method of claim 16, further comprising moving a repair mechanism into a position in proximity to the breach to dispense a repair material from the repair mechanism to seal the breach.

18. The method of claim 17, wherein the repair mechanism comprises an adhesive spray applicator and a patch applicator to apply an adhesive spray and a patch over the breach.

* * * * *